United States Patent
Luo

(10) Patent No.: US 9,170,959 B2
(45) Date of Patent: Oct. 27, 2015

(54) METHOD AND DEVICE FOR CONFIGURING STORAGE SYSTEM CONNECTION

(71) Applicant: HUAWEI TECHNOLOGIES CO., LTD., Shenzen, Guangdong (CN)

(72) Inventor: Jiaolin Luo, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 306 days.

(21) Appl. No.: 13/727,063

(22) Filed: Dec. 26, 2012

(65) Prior Publication Data

US 2013/0117480 A1    May 9, 2013

Related U.S. Application Data

(63) Continuation of application No. PCT/CN2011/084906, filed on Dec. 29, 2011.

(30) Foreign Application Priority Data

Dec. 29, 2010    (CN) .......................... 2010 1 0624699

(51) Int. Cl.
*G06F 13/00* (2006.01)
*G06F 9/44* (2006.01)
(Continued)

(52) U.S. Cl.
CPC .............. *G06F 13/00* (2013.01); *G06F 9/4411* (2013.01); *G06F 11/2005* (2013.01); *G06F 11/2017* (2013.01); *G06F 11/1423* (2013.01)

(58) Field of Classification Search
CPC .................................................... G06F 9/4411

USPC .................................................. 710/305–317
See application file for complete search history.

(56) References Cited

U.S. PATENT DOCUMENTS

| 6,553,416 B1 * | 4/2003 | Chari et al. .................... 709/224 |
| 6,868,438 B2 * | 3/2005 | Fujimoto ....................... 709/213 |
| 6,883,065 B1 | 4/2005 | Pittelkow et al. |

(Continued)

FOREIGN PATENT DOCUMENTS

| CN | 1350674 A | 5/2002 |
| CN | 1549537 A | 11/2004 |

(Continued)

OTHER PUBLICATIONS

1st Office Action in corresponding Chinese Patent Application No. 201010624699.0 (Jan. 6, 2013).

(Continued)

*Primary Examiner* — Raymond Phan
(74) *Attorney, Agent, or Firm* — Leydig, Voit & Mayer, Ltd.

(57) ABSTRACT

A method for configuring a connection in a storage system is provided. A configuring device determines that the configuring device cannot communicate with a first control board; searches a route information table for route information related to the first control board, wherein the route information is route information between an adapter card and the first control board, wherein the adapter card is connected to a north bridge of the first control board through a PCIe bus; modifies the searched out route information by changing an address of the first control board in the route information to an address of a second control board, and stores the modified route information in the route information table.

10 Claims, 3 Drawing Sheets

(51) Int. Cl.
*G06F 11/20* (2006.01)
*G06F 11/14* (2006.01)

(56) References Cited

U.S. PATENT DOCUMENTS

| | | | |
|---|---|---|---|
| 7,020,089 B2* | 3/2006 | Matsuda | 370/242 |
| 7,263,570 B2* | 8/2007 | Papa et al. | 710/302 |
| 7,814,241 B2* | 10/2010 | Honda | 710/38 |
| 2006/0005076 A1 | 1/2006 | Brown et al. | |
| 2007/0223263 A1 | 9/2007 | Erdmann | |
| 2010/0169719 A1 | 7/2010 | Carruzzo et al. | |

FOREIGN PATENT DOCUMENTS

| | | |
|---|---|---|
| CN | 101405702 A | 4/2009 |
| CN | 101588518 A | 11/2009 |
| CN | 101778017 A | 7/2010 |
| CN | 102129400 A | 7/2011 |
| EP | 1347366 A2 | 9/2003 |
| EP | 1901522 A1 | 3/2008 |

OTHER PUBLICATIONS

International Search Report in corresponding PCT Patent Application No. PCT/CN2011/084906 (Mar. 29, 2012).

* cited by examiner

METHOD AND DEVICE FOR CONFIGURING STORAGE SYSTEM CONNECTION

CROSS-REFERENCE TO RELATED APPLICATIONS

This application is a continuation of International Patent Application No. PCT/CN2011/084906, filed Dec. 29, 2011, which claims priority to Chinese Patent Application No. 201010624699.0, filed on Dec. 29, 2010, both of which are incorporated herein by reference in their entireties.

FIELD

The present disclosure relates to the field of data storage technologies, and in particular, to a method for configuring a storage system connection, a device and a storage system.

BACKGROUND

FIG. 1 is a hardware structure diagram of a storage system in the prior art. As shown in FIG. 1, in this storage system, a user host 1 and a disk chassis 2 are each directly connected to its adapter card 3; and the adapter card 3 is connected to a north bridge 4 through a PCIe bus (one of extended personal computer bus interface specification PCI buses), and is further connected to a central processing unit (CPU) 5. Because the CPUS does not have a direct bus interface, the CPUS may be connected to peripherals (such as the user host and the disk chassis) through a chip of the north bridge 4. A function of the adapter card 3 is to implement a specific physical link protocol, so that a request is sent or received through a physical link. Besides, a memory chip 6 is configured for the CPUS exclusively. The adapter card connected to the user host 1 is called a front-end adapter card; and the adapter card connected to the disk chassis 2 is called a back-end adapter card.

The foregoing north bridge 4 and the CPU 5 form a control board. In the prior art, the control board serves a group of user hosts located at a front end. Meanwhile, several disk chassis are configured, so that an independent storage subsystem including a control board is formed. That is, in a storage subsystem, a user host can request only one control board to store or read data, and a disk chassis is controlled by only one control board.

In the existing storage system, if a problem occurs on the north bridge or the CPU of its control board or the connection, for example, when the CPU is damaged or in hibernation, it causes the front-end user host and the disk chassis that exist in the same storage subsystem as the CPU to fail.

SUMMARY

Embodiments of the present invention provide a method for configuring a connection in a storage system, a device and a storage system, so as to improve system stability of the storage system.

An embodiment of the present invention provides a method for configuring a connection in a storage system. The storage system includes an adapter card, a configuring device, a first control board and a second control board. The configuring device is connected to the first control board and the second control board, and the adapter card is connected to the configuring device. The method includes:

determining, by the configuring device, that the configuring device cannot communicate with the first control board;

searching, by the configuring device, a route information table for route information related to the first control board, wherein the route information is route information between the adapter card and the first control board, wherein the adapter card is connected to a north bridge of the first control board through a PCIe bus;

modifying, by the configuring device, the searched out route information by changing an address of the first control board in the route information to an address of the second control board, and storing the modified route information in the route information table;

receiving, by the configuring device, a message forwarded by the adapter card; and sending, by the configuring device, the message to the second control board by using the modified route information.

An embodiment of the present invention further provides a device for configuring a connection in a storage system. The storage system includes a first control board and a second control board which are connected to the device. The device includes:

a determining module, configured to determine that the device cannot communicate with the first control board;

a storage module, configured to store a route information table that comprises route information between an adapter card and the first control board, wherein the adapter card is connected to a north bridge of the first control board through a PCIe bus;

a searching module, configured to search the route information table for the route information between the adapter card and the first control board; and a route information modifying module, configured to modify the searched out route information by changing an address of the first control board in the route information to an address of the second control board, and store the modified route information into the storage module; and a service processing module, configured to receive a message which is forwarded by the adapter card, and forward the received message to the second control board by using the modified route information.

An embodiment of the present invention further provides a storage system. The storage system includes: a first control board and a second control board each of which includes a CPU, a memory chip and a north bridge; a configuring device connected to the first control board and the second control board; an adapter card which is connected to the configuring device, wherein the adapter card is connected to the north bridge of the first control board through a PCIe bus. The configuring device is configured to: determine that the configuring device cannot communicate with the first control board; search a route information table for route information related to the first control board, wherein the route information is route information between the adapter card and the first control board; modify the searched out route information by changing an address of the first control board in the route information to an address of the second control board, and store the modified route information in the route information table; receive a message forwarded by the adapter card; and send the received message to the second control board by using the modified route information so that the second control board sends the message to a disk chassis.

In some embodiments of the present invention, the apparatus for configuring connection is set, and the apparatus obtains the information about the failed control board in the storage system, modifies the route information about the failed control board, and then performs service processing according to the modified route information. That is, a non-failed control board provides a service for the user, which can improves the stability of the storage system.

BRIEF DESCRIPTION OF THE DRAWINGS

To illustrate the technical solutions in the embodiments of the present invention or in the prior art more clearly, the following briefly describes accompanying drawings required for describing the embodiments or the prior art. Obviously, the accompanying drawings in the following description are some embodiments of the present invention, and persons of ordinary skill in the art may obtain other drawings from these accompanying drawings without making creative efforts.

DETAILED DESCRIPTION OF THE EMBODIMENTS

To make the objectives, technical solutions, and advantages of the present invention more clear, the following clearly and completely describes the technical solutions according to the embodiments of the present invention with reference to the accompanying drawings in the embodiments of the present invention. Obviously, the described embodiments are part of rather than all of the embodiments of the present invention. All other embodiments obtained by persons of ordinary skill in the art based on the embodiments of the present invention without making creative efforts shall fall within the protection scope of the present invention.

To solve a defect of low stability of a storage system in the prior art, the embodiments of the present invention provide a technical solution. The technical solution can enable a user host or a disk chassis to be connected to multiple control boards through an adapter card. When a certain control board fails, a user equipment associated with the failed control board is connected to a non-failed control board by modifying route information, and the non-failed control board serves the user equipment, so that the stability of the storage system is improved.

Figure 1:
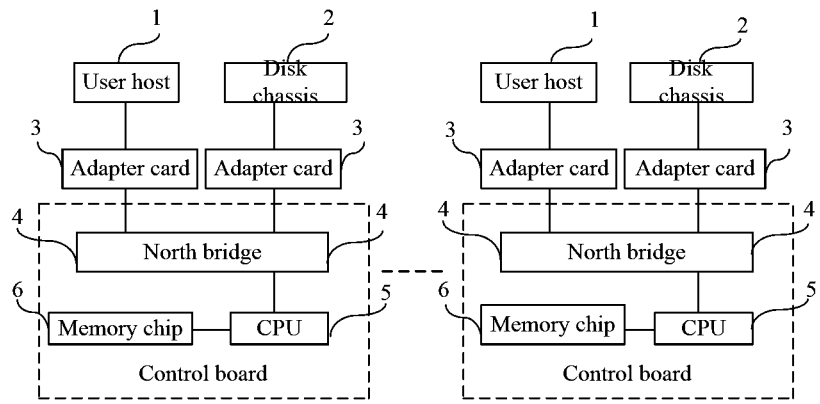
FIG. 1 is a hardware structural diagram of a storage system in the prior art.
Figure 2:
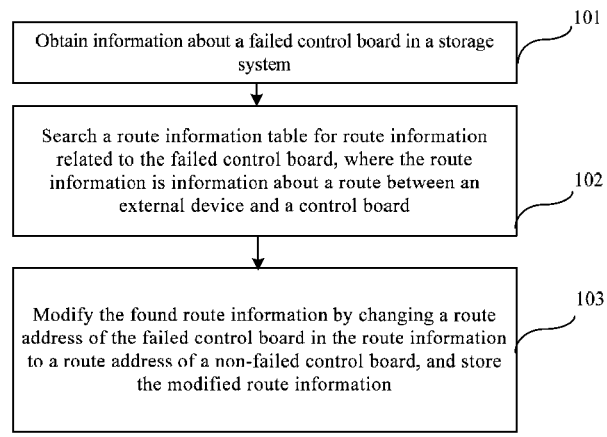
FIG. 2 is a schematic flowchart of a method for configuring a storage system connection according to an embodiment of the present invention.

FIG. 2 is a schematic flowchart of a method for configuring a storage system connection according to an embodiment of the present invention. As shown in FIG. 2, the method includes the following:

Step 101: Obtain information about a failed control board in a storage system.

Step 102: Search a route information table for route information related to the failed control board, where the route information is route information between a peripheral and a control board.

Step 103: Modify the searched-out route information by changing a route address of the failed control board in the route information to a route address of a non-failed control board, and store the modified route information.

Figure 3:
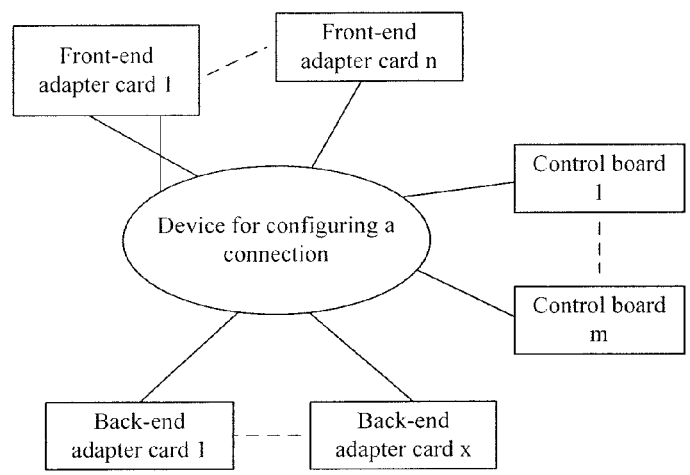
FIG. 3 is a schematic diagram of route information according to an embodiment of the present invention.

According to the method for configuring the storage system connection in the foregoing embodiment, the information about the failed control board in the storage system is obtained first, and then the pre-stored route information related to the failed control board is searched for. For example, as shown in FIG. 3, a device for configuring the connection stores the route information from the control board to a front-end adapter card and the route information from the control board to a back-end adapter card, and modifies the foregoing route information, that is, reconfigures the route between the peripheral and the control board, and modifies the topology structure of the storage system, so that a service may be provided for the foregoing peripheral by another control board, and stability of the storage system can be effectively provided. Benefits include two aspects: one is that in a case that the control board is damaged or a line connection is faulty, communication with the peripheral can still persist, and a service is further provided for a user; the other is that, it is supported that part of the control boards are in a hibernation state, without affecting the service provided for a user host.

The searching the route information table for the route information related to the failed control board in step 102 may be: searching the route information table for the route information between the failed control board and the front-end adapter card, and searching the route information table for the route information between the failed control board and the back-end adapter card.

Besides, in this embodiment, after the route information table is updated, a non-failed control board may provide the service for the peripheral. Specifically, when the peripheral is a front-end adapter card, the method may further include:

receiving a data storing request or a data read request that is initiated by the user host and is forwarded by the front-end adapter card, and forwarding the data storing request or the data read request to the non-failed control board according to the modified route information.

The obtaining the information about the failed control board in the storage system may be implemented in the following methods:

One is sending a detection packet to the control board in the storage system, and determining that the control board is damaged if no detection response is received in a preset time threshold, where the detection may be periodically performed by a dedicated program in the system, and the preset time threshold may be obtained according to factors such as time consumed during transmission of the detection packet, response time of the device in a normal case, and so on; the other one is receiving a control board hibernation message sent by the control board when the control board is hibernation, where the control board hibernation message may be forwarded by a north bridge.

Figure 4:
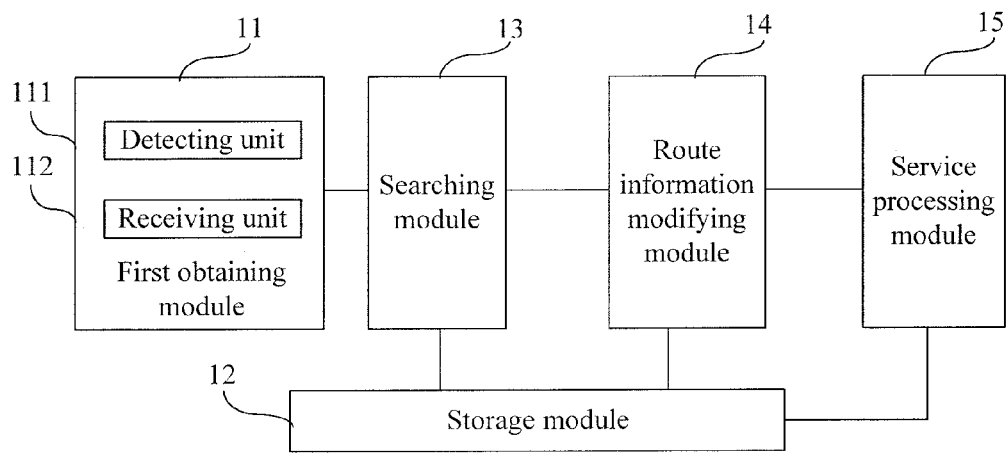
FIG. 4 is a block diagram of a device for configuring a storage system connection according to an embodiment of the present invention.

Corresponding to the embodiment shown in FIG. 2, the present invention further provides a device for configuring a storage system connection. FIG. 4 is a schematic diagram of a device for configuring a storage system connection according to an embodiment of the present invention. As shown in FIG. 4, the device includes a first obtaining module 11, a storage module 12, a searching module 13, and a route information modifying module 14. The first obtaining module 11 is configured to obtain information about a failed control board in a storage system; the storage module 12 is configured to store a route information table that includes route information between a peripheral and a control board; the searching module 13 is configured to search the route information table for the route information related to the failed control board; and the route information modifying module 14 is configured to modify the searched-out route information by changing a route address of the failed control board in the route information to a route address of a non-failed control board, and store the modified route information into the storage module 12.

After the first obtaining module 11 learns that a control board fails, the device for configuring the storage system connection provided in the foregoing embodiment, searches the storage module for the route information related to the control board, where the route information includes routing information between the control board and a front-end adapter card and routing information between the control board and a back-end adapter card, and modifies the route information, that is, reconfigures the route between the peripheral and the control board and modifies topology structure of the storage system, so that a service may be provided for the peripheral by another control board, which can effectively provide stability of the storage system. Specific benefits include two aspects: One is that in a case that the control board is damaged or a line connection is faulty, communication with the peripheral can still persist, and a service is further provided for a user; the other is that, it is supported that part of the control boards are in a hibernation state, without affecting a service provided for a user host.

The route information mentioned in the foregoing embodiment may include route information between the control board and the front-end adapter card, and include route information between the control board and the back-end adapter card.

The foregoing device further includes a service processing module 15. The service processing module 15 is configured to receive a data storing request or a data read request which is initiated by the user host and is forwarded by the front-end adapter card, and forward the data storing request of the data read request to a non-failed control board according to the modified route information.

In addition, according to the device for configuring the storage system connection provided in the foregoing embodiment, the first obtaining module 11 may further include a detecting unit 111 or a receiving unit 112. The detecting unit 111 is configured to send a detection packet to the control board in the storage system, and determine that the control board is damaged if no detection response is received within a preset time threshold; and the receiving unit 112 is configured to receive a control board hibernation message sent by the control board. The information about the failed control board may be obtained by using either of both the foregoing manners.

An embodiment of the present invention further provides a storage system. The storage system includes a front-end adapter card configured to connect to a user host, a back-end adapter card configured to connect to a disk chassis, and two or more control boards, and includes the device for configuring the storage system connection mentioned in the foregoing embodiment. One side of the device (e.g., a device side) for configuring the storage system connection is connected to the front-end adapter card and the back-end adapter card, and the other side (e.g., a processor side) of the device for configuring the storage system connection is connected to the two or more control boards.

The configuring device in the foregoing embodiment is configured in the storage system provided in the foregoing embodiment of the present invention, and can searches a storage module for route information related to the control board after receiving a control board failure message, where the route information includes route information between the control board and the front-end adapter card and route information between the control board and the back-end adapter card, and modifies the route information, that is, reconfigures a route between a peripheral and the control board and modifies topology structure of the storage system, so that a service may be provided for the peripheral by another control board, which can effectively provide stability of the storage system. Specific benefits include two aspects: One is that in a case that the control board is damaged or a line connection is faulty, communication with the peripheral can still persist, and a service is further provided for a user; the other is that, it is supported that part of the control boards are in a hibernation state, without affecting a service provided for the user host.

Figure 5:
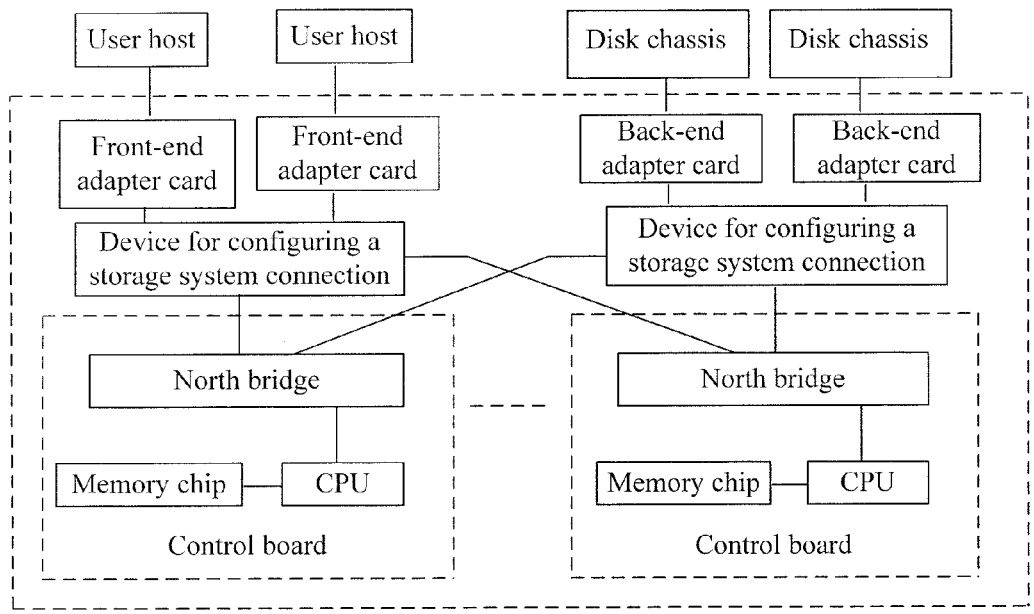
FIG. 5 is a block diagram of a storage system according to an embodiment of the present invention.

FIG. 5 is a schematic diagram of a storage system according to an embodiment of the present invention. As shown in FIG. 5, the storage system includes two devices for configuring a storage system connection, that is a first configuring device and a second configuring device which serve a user host and a disk chassis, and may implement isolation between a front-end service and a back-end service. The devices for configuring the storage system connection are set between an adapter card and a north bridge of a control board. Generally, because the adapter card is connected to the north bridge of the control board through a PCIe bus, the devices for configuring the storage system connection may also be referred to as PCIe switching chips. One of the devices for configuring the storage system connection is connected to two or more connection boards. The devices for configuring the connection in this embodiment may share route information; or, after one of them learns failure of a control board, the device notifies the failure to another control board at the same time, so that both of the devices for configuring the connection can modify their locally stored route information in time to avoid an impact of the failed control board.

Figure 6:
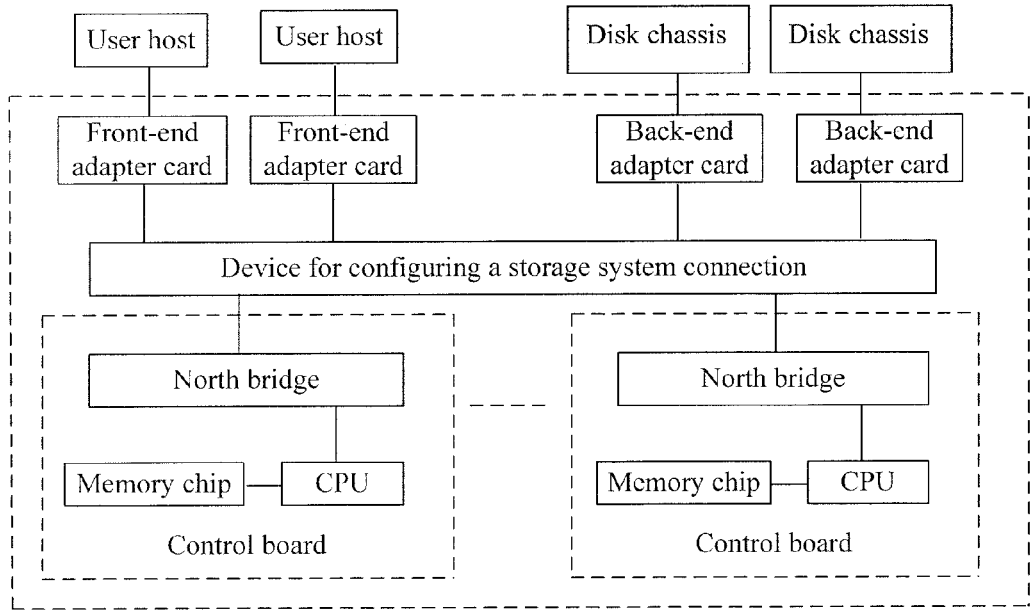
FIG. 6 is a block diagram of a storage system according to an embodiment of the present invention.

FIG. 6 is a schematic diagram of a storage system according to a second embodiment. As shown in FIG. 6, the storage system includes one device for configuring a storage system connection, and provides a service for a user host and a disk chassis simultaneously. The storage system provided in the foregoing embodiment of the present invention can provide system stability, and can also support a working manner of a control board in hibernation, so as to save energy.

Persons of ordinary skill in the art may understand that all of or part of the steps of the foregoing method embodiments may be implemented by a program instructing relevant hardware. The program may be stored in a computer readable storage medium. When the program is executed, the steps of the foregoing methods embodiments are executed. The storage medium may be various media that may store program codes, such as a ROM, a RAM, a magnetic disk, or a compact disk, and the like.

Finally, it should be noted that the foregoing embodiments are merely used for describing the technical solutions of the present invention other than limiting it. Although the present invention is described in detail with reference to the foregoing embodiments, persons of ordinary skill in the art should understand that they may still make modifications to the technical solutions described in the foregoing embodiments or make equivalent replacements to part of the technical features, while such modifications or replacements do not make the nature of relevant technical solutions depart from the spirit and scope of the technical solutions of the embodiments of the present invention.

What is claimed is:

1. In a storage system which comprises an adapter card, a configuring device, a first control board and a second control board, wherein the configuring device is connected to the first control board and the second control board, and the adapter card is connected to the configuring device, a method for configuring a connection comprising:
   determining, by the configuring device, that the configuring device cannot communicate with the first control board;

searching, by the configuring device, a route information table for route information related to the first control board, wherein the route information is route information between the adapter card and the first control board, wherein the adapter card is connected to a north bridge of the first control board through a PCIe bus;

modifying, by the configuring device, the route information table by changing an address of the first control board in the route information to an address of the second control board;

receiving, by the configuring device, a message forwarded by the adapter card; and sending, by the configuring device, the message to the second control board by using the modified route information table.

2. The method according to claim 1, wherein the adapter card is at least one of a front-end adapter card connected to a user host and a back-end adapter card connected to a disk chassis.

3. The method according to claim 1, wherein the adapter card is a front-end adapter card connected to a user host, and the message received by the configuring device is a data storing request message or a data read request message which is initiated by the user host.

4. The method according to claim 1, wherein the determining comprises:

sending, by the configuring device, a detection packet to the first control board, and determining that the first control board is failed if no response message responsive to the detection packet is received within a preset time threshold.

5. A device for configuring a connection in a storage system which comprises a first control board and a second control board which are connected to the device, comprising:

a determining module, configured to determine that the device cannot communicate with the first control board;

a storage module, configured to store a route information table that comprises route information between an adapter card and the first control board, wherein the adapter card is connected to a north bridge of the first control board through a PCIe bus;

a searching module, configured to search the route information table for the route information between the adapter card and the first control board;

a route information modifying module, configured to modify the route information table by changing an address of the first control board in the route information to an address of the second control board; and a service processing module, configured to receive a message which is forwarded by the adapter card, and forward the received message to the second control board by using the modified route information table.

6. The device according to claim 5, wherein the adapter card is a front-end adapter card, and the message is a data storing request message or a data read request message which is initiated from a user host connected to the front-end adapter card.

7. The device according to claim 5, wherein the determining module is configured to:

send a detection packet to the first control board, and determine that the first control board is failed if no response message responsive to the detection packet is received within a preset time.

8. A storage system, comprising:

a first control board and a second control board each of which comprises a CPU, a memory chip and a north bridge;

a configuring device connected to the first control board and the second control board;

an adapter card which is connected to the configuring device, wherein the adapter card is connected to the north bridge of the first control board through a PCIe bus, wherein the configuring device is configured to:

determine that the configuring device cannot communicate with the first control board;

search a route information table for route information related to the first control board, wherein the route information is route information between the adapter card and the first control board;

modify the route information table by changing an address of the first control board in the route information to an address of the second control board;

receive a message forwarded by adapter card; and send the received message to the second control board by using the modified route information table so that the second control board sends the message to a disk chassis.

9. The storage system according to claim 8, wherein the configuring device is configured to:

send a detection packet to the first control board; and determine that the first control board is failed if there is no response message responsive to the detection packet received by the configuring device within a preset time.

10. The storage system according to claim 8, wherein the adapter card is a front-end adapter card, the message received by the configuring device is a data storing request message or a data read request message which is initiated by a user host connected to the front-end adapter card.

* * * * *